(12) United States Patent
Shrestha et al.

(10) Patent No.: US 12,382,348 B2
(45) Date of Patent: Aug. 5, 2025

(54) GROUP HANDOVER CONFIGURATIONS

(71) Applicant: QUALCOMM Incorporated, San Diego, CA (US)

(72) Inventors: Bharat Shrestha, San Diego, CA (US); Jae Ho Ryu, San Diego, CA (US); Toru Uchino, Zushi (JP); Changhwan Park, San Diego, CA (US); Umesh Phuyal, San Diego, CA (US); Prasad Reddy Kadiri, San Diego, CA (US); Le Liu, San Jose, CA (US); Xiao Feng Wang, San Diego, CA (US); Liangping Ma, San Diego, CA (US); Alberto Rico Alvarino, San Diego, CA (US); Masato Kitazoe, Tokyo (JP); Ayan Sengupta, San Diego, CA (US)

( * ) Notice: Subject to any disclaimer, the term of this patent is extended or adjusted under 35 U.S.C. 154(b) by 426 days.

(21) Appl. No.: 17/817,951

(22) Filed: Aug. 5, 2022

(65) Prior Publication Data
US 2024/0049062 A1 Feb. 8, 2024

(51) Int. Cl.
*H04W 36/00* (2009.01)
*H04W 52/02* (2009.01)
*H04W 76/28* (2018.01)

(52) U.S. Cl.
CPC . *H04W 36/0009* (2018.08); *H04W 36/00837* (2018.08); *H04W 52/0219* (2013.01); *H04W 76/28* (2018.02)

(58) Field of Classification Search
None
See application file for complete search history.

(56) References Cited

U.S. PATENT DOCUMENTS

2021/0059004 A1* 2/2021 Wu .................. H04W 52/0219
2023/0337321 A1* 10/2023 Tseng .............. H04W 52/0219

* cited by examiner

*Primary Examiner* — Clemence S Han
(74) *Attorney, Agent, or Firm* — Harrity & Harrity, LLP/Qualcomm

(57) ABSTRACT

Various aspects of the present disclosure generally relate to wireless communication. In some aspects, a user equipment (UE) may receive a group discontinuous reception (DRX) configuration. The UE may receive, based on the group DRX configuration, a notification communication indicative of group handover information associated with a group of UEs that includes the UE. The UE may perform, based on the group handover information, a group handover operation between a source cell and a target cell. Numerous other aspects are described.

29 Claims, 10 Drawing Sheets

GROUP HANDOVER CONFIGURATIONS

FIELD OF THE DISCLOSURE

Aspects of the present disclosure generally relate to wireless communication and to techniques and apparatuses for group handover configurations.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a group discontinuous reception (DRX) configuration. The method may include receiving, based on the group DRX configuration, a notification communication indicative of group handover information associated with a group of UEs that includes the UE. The method may include performing, based on the group handover information, a group handover operation between a source cell and a target cell.

Some aspects described herein relate to a method of wireless communication performed by a network node. The method may include transmitting a group DRX configuration. The method may include transmitting, based on the group DRX configuration, a notification communication indicative of group handover information associated with a group of UEs, wherein the network node is associated with a source cell. The method may include transmitting, to a network node associated with a target cell, a group handover request corresponding to a group handover operation between the source cell and the target cell, wherein the group handover operation is associated with the group handover information.

Some aspects described herein relate to a UE for wireless communication. The UE may include a memory and one or more processors coupled to the memory. The one or more processors may be configured to receive a group DRX configuration. The one or more processors may be configured to receive, based on the group DRX configuration, a notification communication indicative of group handover information associated with a group of UEs that includes the UE. The one or more processors may be configured to perform, based on the group handover information, a group handover operation between a source cell and a target cell.

Some aspects described herein relate to a network node for wireless communication. The network node may include a memory and one or more processors coupled to the memory. The one or more processors may be configured to transmit a group DRX configuration. The one or more processors may be configured to transmit, based on the group DRX configuration, a notification communication indicative of group handover information associated with a group of UEs, wherein the network node is associated with a source cell. The one or more processors may be configured to transmit, to a network node associated with a target cell, a group handover request corresponding to a group handover operation between the source cell and the target cell, wherein the group handover operation is associated with the group handover information.

Some aspects described herein relate to a non-transitory computer-readable medium that stores a set of instructions for wireless communication by a UE. The set of instructions, when executed by one or more processors of the UE, may cause the UE to receive a group DRX configuration. The set of instructions, when executed by one or more processors of the UE, may cause the UE to receive, based on the group DRX configuration, a notification communication indicative of group handover information associated with a group of UEs that includes the UE. The set of instructions, when executed by one or more processors of the UE, may cause the UE to perform, based on the group handover information, a group handover operation between a source cell and a target cell.

Some aspects described herein relate to a non-transitory computer-readable medium that stores a set of instructions for wireless communication by a network node. The set of instructions, when executed by one or more processors of the network node, may cause the network node to transmit a group DRX configuration. The set of instructions, when executed by one or more processors of the network node, may cause the network node to transmit, based on the group DRX configuration, a notification communication indicative of group handover information associated with a group of UEs, wherein the network node is associated with a source cell, wherein the network node is associated with a source cell. The set of instructions, when executed by one or more processors of the network node, may cause the network node to transmit, to a network node associated with a target cell, a group handover request corresponding to a group handover operation between the source cell and the target cell, wherein the group handover operation is associated with the group handover information.

Some aspects described herein relate to an apparatus for wireless communication. The apparatus may include means for receiving a group DRX configuration. The apparatus may include means for receiving, based on the group DRX configuration, a notification communication indicative of group handover information associated with a group of UEs that includes the apparatus. The apparatus may include means for performing, based on the group handover information, a group handover operation between a source cell and a target cell.

Some aspects described herein relate to an apparatus for wireless communication. The apparatus may include means for transmitting a group DRX configuration. The apparatus may include means for transmitting, based on the group DRX configuration, a notification communication indicative of group handover information associated with a group of UEs, wherein the apparatus is associated with a source cell, wherein the apparatus is associated with a source cell. The apparatus may include means for transmitting, to a network node associated with a target cell, a group handover request corresponding to a group handover operation between the source cell and the target cell, wherein the group handover operation is associated with the group handover information.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
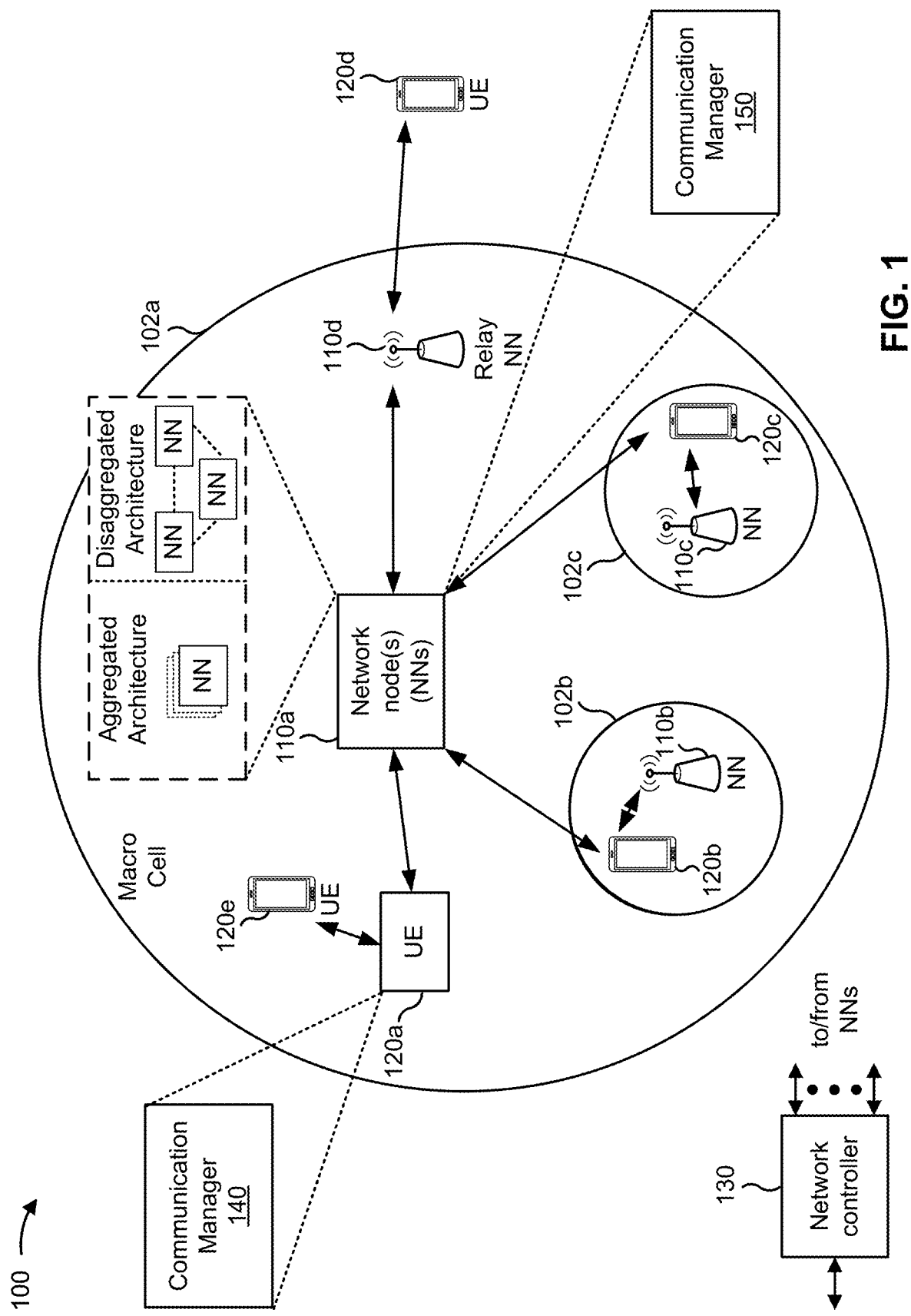
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

In some aspects, the wireless network 100 may include one or more non-terrestrial network (NTN) deployments in which a non-terrestrial wireless communication device may include a UE (referred to herein, interchangeably, as a "non-terrestrial UE") and/or another network node (referred to herein, interchangeably, as a "non-terrestrial network node"). A non-terrestrial network node may include, for example, a base station (referred to herein, interchangeably, as a "non-terrestrial base station") and/or a relay station (referred to herein, interchangeably, as a "non-terrestrial relay station"), among other examples. As used herein, "NTN" may refer to a network for which access is facilitated by a non-terrestrial UE and/or a non-terrestrial network node.

The wireless network 100 may include any number of non-terrestrial wireless communication devices. A non-terrestrial wireless communication device may include a satellite, a manned aircraft system, an unmanned aircraft system (UAS) platform, and/or the like. A satellite may include a low-earth orbit (LEO) satellite, a medium-earth orbit (MEO) satellite, a geostationary earth orbit (GEO) satellite, and/or a high elliptical orbit (HEO) satellite, among other examples. A manned aircraft system may include an airplane, helicopter, and/or a dirigible, among other examples. A UAS platform may include a high-altitude platform station (HAPS), and may include a balloon, a dirigible, and/or an airplane, among other examples. A non-terrestrial wireless communication device may be part of an NTN that is separate from the wireless network 100. Alternatively, an NTN may be part of the wireless network 100. Satellites may communicate directly and/or indirectly with other entities in wireless network 100 using satellite communication. The other entities may include UEs (e.g., terrestrial UEs and/or non-terrestrial UEs), other satellites in the one or more NTN deployments, other types of network nodes (e.g., stationary and/or ground-based network nodes), relay stations, and/or one or more components and/or devices included in a core network of wireless network 100, among other examples.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a group discontinuous reception (DRX) configuration; receive, based on the group DRX configuration, a notification communication indicative of group handover information associated with a group of UEs that includes the UE; and perform, based on the group handover information, a group handover operation between a source cell and a target cell. Additionally, or alternatively, the communication manager 140 may perform one or more other operations described herein.

In some aspects, the network node 110 may include a communication manager 150. As described in more detail elsewhere herein, the communication manager 150 may transmit a group DRX configuration; transmit, based on the group DRX configuration, a notification communication indicative of group handover information associated with a group of UEs, wherein the network node is associated with a source cell; and transmit, to a network node associated with a target cell, a group handover request corresponding to a group handover operation between the source cell and the target cell, wherein the group handover operation is associated with the group handover information. Additionally, or alternatively, the communication manager 150 may perform one or more other operations described herein.

As indicated above, FIG. 1 is provided as an example. Other examples may differ from what is described with regard to FIG. 1.

Figure 2:
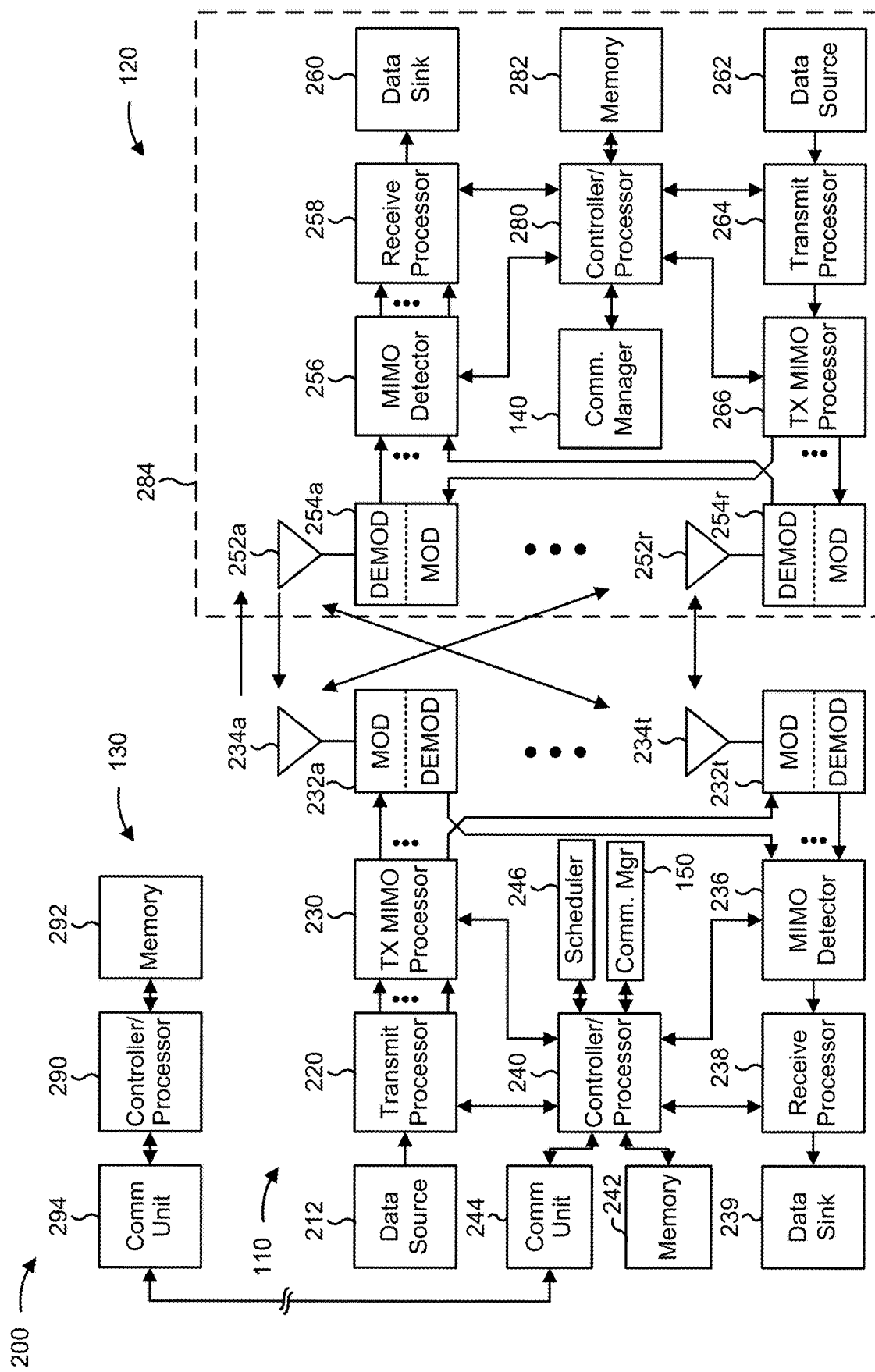
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-10).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-10).

The controller/processor 240 of the network node 110, the controller/processor 280 of the UE 120, and/or any other component(s) of FIG. 2 may perform one or more techniques associated with group handover configurations, as described in more detail elsewhere herein. For example, the controller/processor 240 of the network node 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, a UE (e.g., UE 120) includes means for receiving a group DRX configuration; means for receiving, based on the group DRX configuration, a notification communication indicative of group handover information associated with a group of UEs that includes the UE; and/or means for performing, based on the group handover information, a group handover operation between a source cell and a target cell. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., network node 110) includes means for transmitting a group DRX configuration;

means for transmitting, based on the group DRX configuration, a notification communication indicative of group handover information associated with a group of UEs, wherein the network node is associated with a source cell; and/or means for transmitting, to a network node associated with a target cell, a group handover request corresponding to a group handover operation between the source cell and the target cell, wherein the group handover operation is associated with the group handover information. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
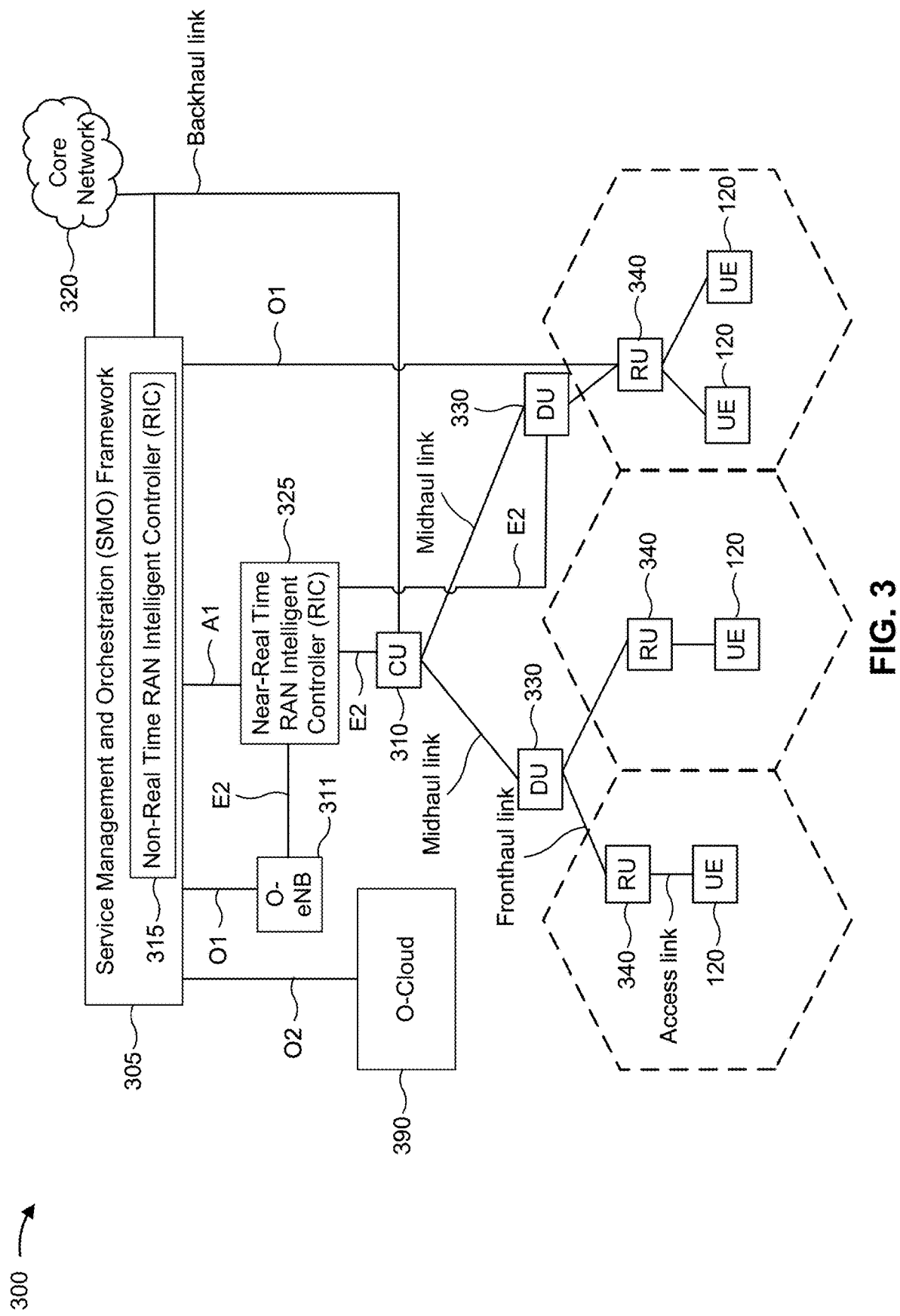
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit—User Plane (CU-UP) functionality), control plane functionality (for example, Central Unit—Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
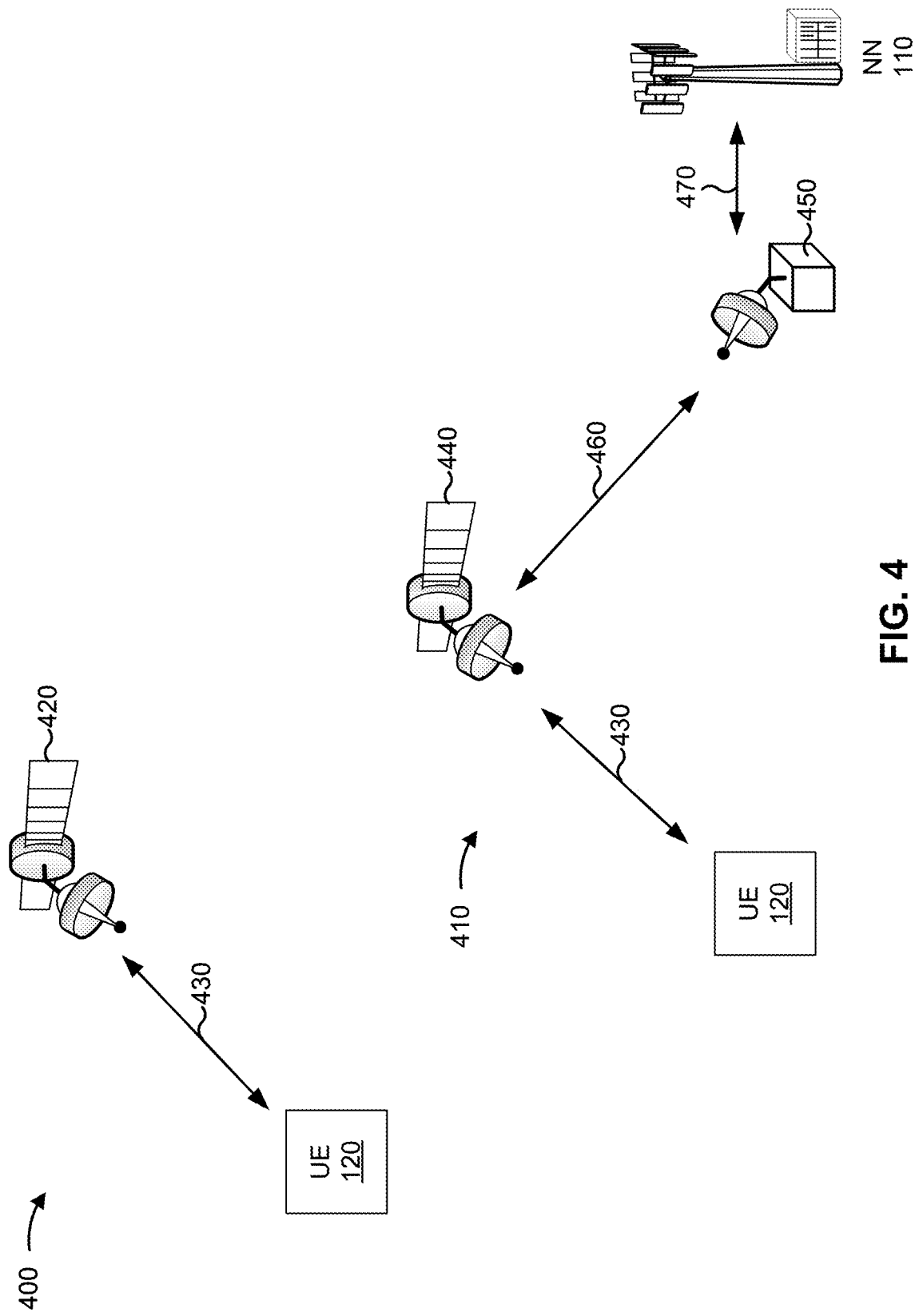
FIG. 4 is a diagram illustrating examples of non-terrestrial network (NTN) deployments.

FIG. 4 is a diagram illustrating examples 400 and 410 of NTN deployments. The example 400 and/or the example 410 may be, be similar to, include, or be included in, a wireless network such as the wireless network 100 shown in, and described in connection with, FIG. 1.

Example 400 shows a conceptual depiction of a regenerative satellite deployment. In example 400, a UE 120 is served by a non-terrestrial network node 420 via a service link 430. For example, the non-terrestrial network node 420 may include a network node 110 (e.g., NN 110a) such as a base station, a gNB, or more functions (e.g., RF filtering, frequency conversion, amplification, demodulation, decoding, switching, routing, coding, and/or modulation, among other examples) of a network node 110 and/or a disaggregated base station architecture 300, among other examples. Although illustrated as a satellite, the non-terrestrial network node 420 may be implemented as any type of non-terrestrial device, as described above in connection with FIG. 1.

The service link 430 may include an NR-Uu interface that is terminated at the non-terrestrial network node 420. In some aspects, the non-terrestrial network node 420 may be referred to as a non-terrestrial base station, a regenerative repeater, and/or an on-board processing repeater, among other examples. In some aspects, the non-terrestrial network node 420 may demodulate an uplink radio frequency signal, and may modulate a baseband signal derived from the uplink radio signal to produce a downlink radio frequency transmission. The non-terrestrial network node 420 may transmit the downlink radio frequency signal on the service link 430. The non-terrestrial network node 420 may provide a cell that covers the UE 120.

Example 410 shows a transparent satellite deployment, which may also be referred to as a bent-pipe satellite deployment. In example 410, a UE 120 is served by a non-terrestrial network node 440 (e.g., a satellite) via the service link 430. The non-terrestrial network node 440 may be referred to as a transparent satellite, a bent-pipe satellite, and/or a non-terrestrial relay station, among other examples. The non-terrestrial network node 440 may relay a signal received from a terrestrial network node 110, via an NTN gateway 450. The non-terrestrial network node 440 may repeat an NR-Uu interface via a feeder link 460. The NTN gateway 450 may communicatively connect the non-terrestrial network node 440 and the network node 110 using an RF link 470. For example, the non-terrestrial network node 440 may receive an uplink radio frequency transmission, and may transmit a downlink radio frequency transmission without demodulating the uplink radio frequency transmission. In some aspects, the non-terrestrial network node 440 may frequency convert the uplink radio frequency transmission received on the service link 430 to a frequency of the downlink radio frequency transmission on the feeder link 460, and may amplify and/or filter the uplink radio frequency transmission. In some aspects, the UEs 120 shown in example 400 and example 410 may be associated with a Global Navigation Satellite System (GNSS) capability, and/or a Global Positioning System (GPS) capability, among other examples, though not all UEs have such capabilities. The non-terrestrial network node 440 may provide and/or facilitate a cell that covers the UE 120.

The service link 430 may include a link between the non-terrestrial network node 440 and the UE 120, and may include one or more of an uplink or a downlink. The feeder link 460 may include a link between the non-terrestrial network node 440 and the gateway 450, and may include one or more parts of an uplink (e.g., from the UE 120 to the gateway 450) or a downlink (e.g., from the gateway 450 to the UE 120).

The feeder link 460 and the service link 430 may each experience Doppler effects due to the movement of the non-terrestrial network node 420 and 440, and potentially movement of a UE 120. These Doppler effects may be significantly larger than in a terrestrial network. The Doppler effect on the feeder link 460 may be compensated for to some degree, but may still be associated with some amount of uncompensated frequency error. Furthermore, the gateway 450 may be associated with a residual frequency error, and/or the non-terrestrial network node 420/440 may be associated with an on-board frequency error. These sources of frequency error may cause a received downlink frequency at the UE 120 to drift from a target downlink frequency.

As indicated above, FIG. 4 is provided as an example. Other examples may differ from what is described with regard to FIG. 4.

Figure 5:
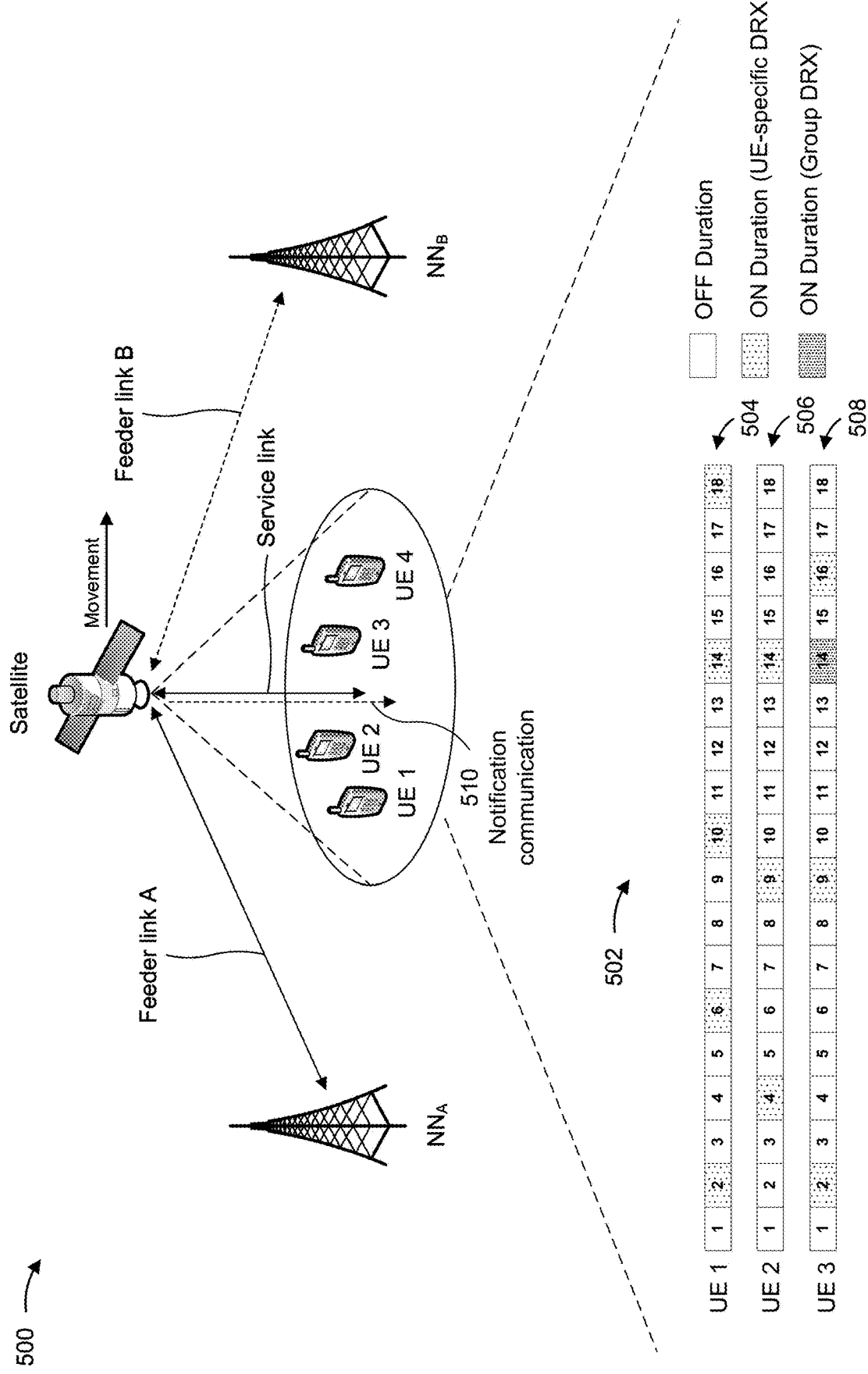
FIG. 5 is a diagram illustrating an example of NTN communications, in accordance with the present disclosure.

FIG. 5 is a diagram illustrating an example 500 of NTN communications, in accordance with the present disclosure. For example, FIG. 5 illustrates a transparent deployment in which a satellite communicates with various UEs (shown as UE 1 through UE 4) in a cell provided by the satellite using a service link, and further in which the satellite communicates with a network node (e.g., a terrestrial base station located on the ground) using a feeder link. For example, in FIG. 5, the satellite may initially be communicating with a first network node (shown as NNA) using a first feeder link (shown as feeder link A). Accordingly, the UEs located in the cell provided by the satellite may generally need to perform a two-step random access channel (RACH) procedure or a four-step RACH procedure to connect to the first network node associated with the active feeder link.

However, as the satellite moves, the satellite may need to switch the feeder link (e.g., because the serving base station associated with the active feeder link is out-of-coverage, out-of-range, and/or out-of-service, among other examples). For example, as shown in FIG. 5, the satellite may be moving away from the first network node and toward a second network node (shown as NNB), whereby the satellite may need to connect to the second network node to switch the feeder link from the first network node to the second network node. Accordingly, as shown at 510, switching the feeder link from the first network node to the second network node may prompt a handover for all UEs located in the cell provided by the satellite. For example, after the satellite connects to the second network node and prior to switching the feeder link over to the second network node, the satellite may transmit a handover command to the UEs that are served by the satellite via the service link. As a result, all of the UEs served by the satellite may need to be handed over from the first network node to the second network node.

However, the handover mechanism used can be too inefficient for a group handover. In some cases, for example, each UE is given a dedicated handover command. It is possible that UEs may have stored the handover command message of the target cell beforehand. However, when these UEs try to connect to a target cell, it may create congestion in the target cell. In such cases, the congestion in the target cell may cause the RACH procedure to fail for one or more UEs attempting to connect to the target cell and/or degrade performance for one or more UEs that are connected to the target cell, among other examples.

In some cases, a group handover can be supported, in which case a group of UEs would need to monitor a physical downlink control channel (PDCCH) to receive the group handover command. However, not all UEs may have a same discontinuous reception (DRX) pattern and/or may not be monitoring the PDCCH at the same time because the UEs can have different DRX ON durations. For example, the schematic representation 502 of respective DRX configurations depicts illustrative DRX configurations 504, 506, and 508 associated with UE 1, UE 2, and UE 3, respectively. As shown, the DRX configuration 504 includes ON durations in time periods 2, 6, 10, 14, and 18. The DRX configuration 506 includes ON durations in time periods 4, 9, and 14, and the DRX configuration 508 includes ON durations in time periods 2, 9, and 16. Because there is no time period in which the three DRX configurations 504, 506, and 508 all have an ON duration, one or more of the UEs can fail to receive a group handover command transmitted to the group. The time periods can be frames, sub-frames, slots, sub-slots, and/or symbols, among other examples.

Some aspects of the techniques and apparatuses described herein may provide a group DRX configuration that applies to all of the UEs in a group. For example, in some aspects, as shown by reference number 510, a network node (e.g., via the satellite) may transmit, and the UEs (e.g., UE 1, UE 2, and UE 3) may receive, based on a group DRX configuration, a notification communication indicative of group handover information associated with a group of UEs that includes the UE. A group DRX offset (shown as "Offset=13" to illustrate an example in which the group DRX offset is equal to 13 time periods) may correspond to the group DRX configuration. In the illustrated example, the group DRX configuration results in an additional DRX ON duration for the UE 3 in time period 14, thereby providing a time period (time period 14) in which all of the UEs have a DRX ON duration. The UEs may perform a group handover operation based on the group handover information. In this way, some aspects may facilitate coordinating UEs in a group of UEs for a group handover, thereby facilitating continuity of service among groups of UEs communicating with an NTN, which may positively impact network performance.

As indicated above, FIG. 5 is provided as an example. Other examples may differ from what is described with regard to FIG. 5.

Figure 6:
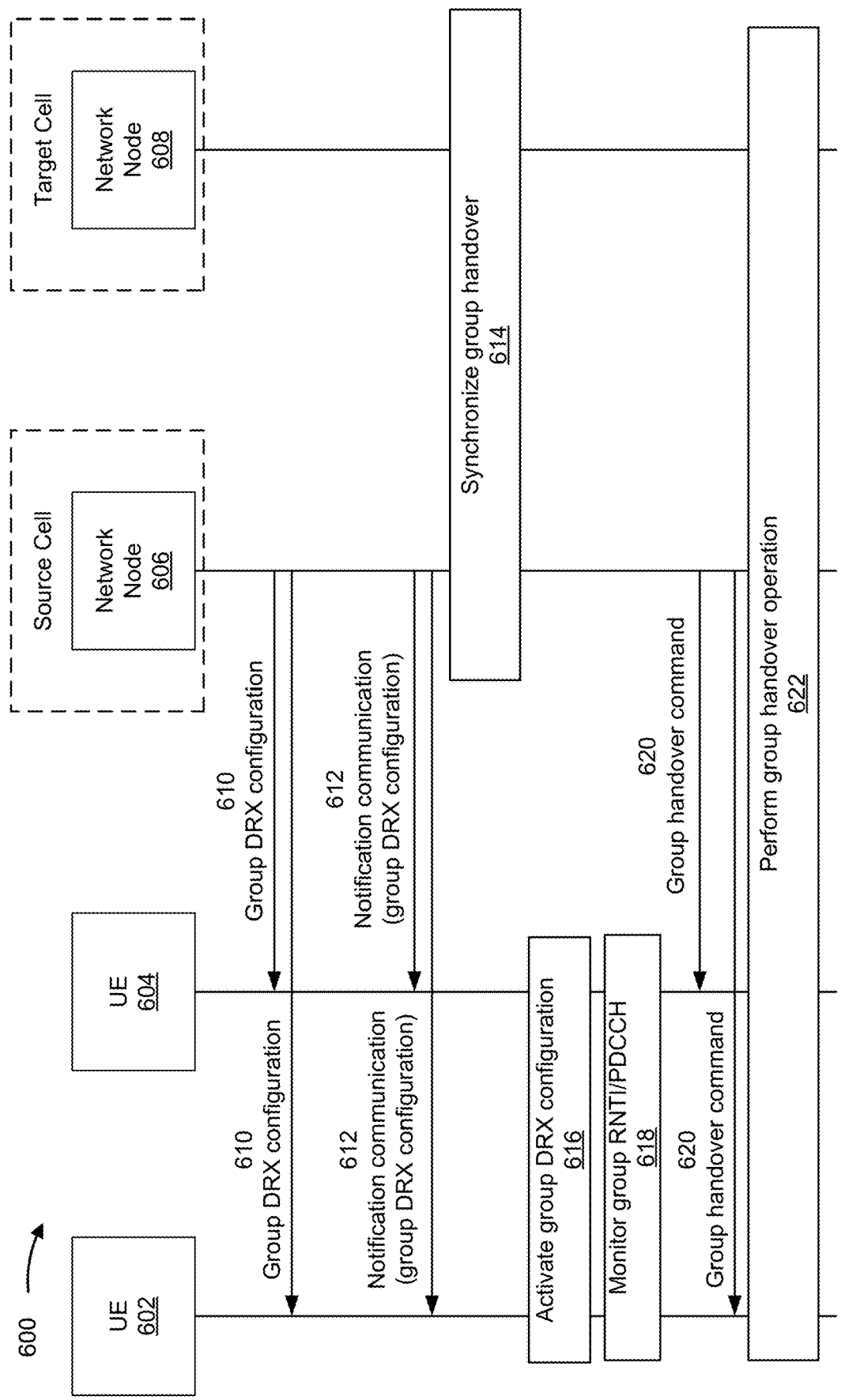
FIG. 6 is a diagram illustrating an example associated with group handover configurations, in accordance with the present disclosure.

FIG. 6 is a diagram illustrating an example 600 associated with group handover configurations, in accordance with the present disclosure. As shown in FIG. 6, a UE 602 and a UE 604 may communicate (for example, transmit an uplink transmission or receive a downlink transmission) with a network node 606 and a network node 608. The UEs 602 and 604, the network node 606, and the network node 608 may be part of a wireless network (such as the wireless network 100). In some aspects, the wireless network may include an NTN. In some aspects, the UE 602 and/or the UE 604 may be, be similar to, include, or be included in, the UE 1, UE 2, or UE 3 depicted in FIG. 5 and/or the UE 120 depicted in FIGS. 1-4. In some aspects, the network node 606 and/or the network node 608 may be, be similar to, include, or be included in, the satellite depicted in FIG. 5, the non-terrestrial network node 420 and/or the non-terrestrial network node 440 depicted in FIG. 4, the network node 110 depicted in FIGS. 1, 2, and 4, and/or one or more components of the disaggregated base station architecture 300 depicted in FIG. 3.

The network node 606 may be associated with a source cell (e.g., a source non-terrestrial cell). In some aspects, the network node 606 may communicate with the UEs 602 and/or 604 via a satellite (e.g., satellite 440 of FIG. 4) that relays communications between the network node 606 and the UEs 602 and/or 604. For example, the network node 606 may transmit downlink communications on a feeder link to the satellite, and the UEs 602 and/or 604 may receive the downlink communications on a service link from the satellite. The UEs 602 and/or 604 may transmit uplink communications on the service link to the satellite, and the network node 606 may receive the uplink communications on the feeder link from the satellite. In some aspects, the network node 606 may be a non-terrestrial network node.

The network node 608 may be associated with a target cell (e.g., a target non-terrestrial cell). In some aspects, the network node 608 may communicate with the UEs 602 and/or 604 via a satellite (e.g., satellite 440 of FIG. 4) that relays communications between the network node 608 and the UEs 602 and/or 604. For example, the network node 608 may transmit downlink communications on a feeder link to the satellite, and the UEs 602 and/or 604 may receive the downlink communications on a service link from the satellite. The UEs 602 and/or 604 may transmit uplink communications on the service link to the satellite, and the network node 608 may receive the uplink communications on the feeder link from the satellite. In some aspects, the network node 608 may be a non-terrestrial network node. The source cell, associated with the network node 606, may be a serving cell for the UEs 602 and/or 604. For example, the UEs 602 and/or 604 may have an established connection (such as an RRC connection in an active or connected state) with the network node 606. The network node 608 may be a target network node associated with a target cell for a group handover procedure.

As shown by reference number 610, the network node 606 may transmit, and the UEs 602 and 604 may receive, a group DRX configuration. As shown by reference number 612, the network node 606 may transmit, and the UEs 602 and 604 may receive, a notification communication. The network node 606 may transmit, and the UEs 602 and 604 may receive, the notification communication based on the group DRX configuration. The notification communication may be indicative of group handover information associated with a group of UEs that includes the UEs 602 and 604. In some aspects, the network node 606 may transmit an additional notification communication indicative of additional group handover information associated with an additional group of UEs.

In some aspects, the group handover information may indicate a group DRX offset associated with the group DRX configuration. The group handover information may indicate a group DRX cycle associated with the group DRX configuration. The group DRX configuration may indicate a group DRX occasion corresponding to a PDCCH associated with the group of UEs. In some aspects, for example, the group DRX occasion may correspond to a subframe number (SFN) based on a modular relationship between a group DRX cycle and a group DRX offset. For example, the group DRX offset (drx-GroupStartOffset) may replace the UE specific drx-StartOffset, and may be defined according to the following relationship: [(SFN×10)+subframe number] modulo (drx-ShortCycle)=(drx-GroupStartOffset) modulo (drx-ShortCycle).

For some UEs, a group DRX occasion may not align with the UE specific DRX occasion, in which case the UE may be configured to wake up to monitor the group PDCCH. In this way, the network may minimize the occurrence of such misalignment for UEs in the group. For example, the occasion may be an SFN satisfying a group DRX cycle as (SFN mod GroupDRX cycle)=GroupOffset. In some aspects, if the group DRX is not configured or present, then the UE 602 and/or 604 may monitor the group radio network temporary identifier (RNTI) in each UE specific DRX occasion.

In some aspects, a time window may be configured for monitoring, by the UE 602 and/or 604, of the group RNTI PDCCH and/or for activating the new group DRX. For example, the group DRX configuration may indicate a time window associated with the group handover operation. The group DRX configuration may indicate a start time, T1, associated with the time window and/or an end time, T2. In some aspects, for example, only a start time may be indicated. The start time and/or end time may be indicated, for example, according to coordinated universal time (UTC).

In some aspects, if the UE is configured with a time-based conditional handover (CHO), the same time window defined for the CHO may be used to activate the group DRX. In some aspects, the time window may be started after the UE receives a command from the network node 606 (e.g., a PDCCH command and/or a medium access control control element (MAC CE) command). In some aspects, the notification communication may include system information (e.g., a system information block (SIB)) and may be indicative of a cell stop time offset. A group DRX active time may be based on the cell stop time offset, and the group DRX active time may correspond to the group DRX configuration. For example, if the cell stop time is t1, then the group DRX active time is (t1-delta).

In some aspects, the system information may be indicative of a switch time, and a group DRX active time may be based on the switch time. The switch time may include at least one of a satellite switch time or a gateway switch time. For example, in some aspects, a satellite switch time or gateway switch time may be broadcast in an SIB as a group DRX active time. In some aspects, the group of UEs (including UE 602 and UE 604) may be distributed in time by a UE specific offset configured to the UE 602 and/or 604. For example, in some aspects, the system information may be indicative of a UE-specific time distribution offset. In some aspects, the network node 606 may transmit, and the UE 602 and/or UE 604 may receive, a UE-specific RRC message that indicates a time window associated with the group handover operation.

In some aspects, a wake-up signal may be used to wake up the UE 602 and/or 604 during the group DRX ON duration. For example, in some aspects, the notification communication may include a wake-up signal associated with the group handover operation. The wake-up signal may include a PDCCH wake up signal. The wake-up signal may include a group wake-up signal associated with the group of UEs. In some aspects, the wake-up signal may include a UE-specific wake-up signal associated with a UE-specific DRX occasion. In some aspects, a PDCCH monitoring occasion associated with the group handover operation may correspond to an offset relative to a wake-up signal occasion corresponding to the wake-up signal.

In some aspects, a paging DRX occasion may be used as a group DRX occasion. Each UE may determine the group DRX occasion based on its identity, a zero value of the identity, or a group identity. Similar to UE behavior with respect to a paging operation, the UE may monitor the paging radio network temporary identifier (P-RNTI) in the group DRX occasion. The UE may monitor the group DRX occasion at least once in a modification period or a predefined duration. The paging message may be a short message with or without PDSCH scheduling. A reserved bit in a short message may be used to indicate group handover. In some aspects, the group handover command may be scheduled in PDSCH by the short message. In some aspects, the group handover command scheduling may be predefined for the group of UEs, similar to the broadcast message, and the UEs may read the handover message as a broadcast message after receiving the notification in the group DRX occasion.

As shown by reference number 614, the network node 606 and the network node 608 may synchronize a group handover operation. For example, the network node 606 may transmit a group handover request to the network node 608 and may receive a set of acknowledgements from the network node 608. In some aspects, the network node 606 may transmit group handover information to the network node 608. The group handover information may indicate the group DRX configuration, a group radio network temporary identifier (RNTI), information associated with a group of admitted UEs, and/or timing information, among other examples.

In some cases, for example, all UEs in a UE group may not be admitted by the target cell. Some coordination between source and target may be performed to facilitate the group handover associated with the admitted UEs. For example, in some aspects, the source cell and target cell may be coordinated when the network node 606 configures the group of UEs for group DRX. For example, in some aspects, the UE 602 and/or 604 may be configured to perform the group handover operation based on the UE 602 and/or 604 being included in a set of admitted UEs of the group of UEs. The UEs 602 and/or 604 may be included in the set of admitted UEs based on a timing advance (TA) relative to the target cell. For example, the UE 602 and/or 604 may be included in the set of admitted UEs based on having an associated TA that is similar (e.g., within a specified range) to the TA of the target cell. In some aspects, the number of UEs in a set of admitted UEs may be determined by the network node 608 based on the number of resources available. In some aspects, the UE 602 and/or 604 may be included in the set of admitted UEs based on at least one of a priority associated with the UE 602 and/or 604, a quality of service (QoS) associated with the UE 602 and/or 604, and/or a characteristic of pending data associated with the UE 602 and/or 604. For example, in some aspects, the group handover operation may be associated with at least one of a contention free physical random access channel (PRACH) resource or a dedicated PRACH resource, and based on UE prioritization, QoS, and/or pending data, network node 608 may provide a contention free or dedicated PRACH resource specific to a group of UEs.

As shown by reference number 616, the UE 602 and the UE 604 may activate the group DRX configuration. In some aspects, the UE 602 and/or 604 may activate the group DRX configuration during the time window described above. In some aspects, the UE 602 and/or 604 also may deactivate a UE-specific DRX configuration based on activating the group DRX configuration.

As shown by reference number 618, the UE 602 and/or 604 may monitor an RNTI and/or PDCCH based on the group DRX configuration. In some aspects, the UE 602 and/or 604 may monitor the RNTI and/or PDCCH based on a UE-specific DRX configuration. In some aspects, the UE 602 and/or 604 may monitor a PDCCH based on a bandwidth part (BWP). The BWP may include a default BWP and/or a group DRX specific BWP. In some aspects, the group handover information may indicate the group DRX specific BWP.

As shown by reference number 620, the network node 606 may transmit, and the UEs 602 and 604 may receive, a group handover command. The group handover command may be received during the group DRX ON duration (e.g., during the time window). As shown by reference number 622, the UE 602 and/or the UE 604 may perform a group handover operation between the source cell and the target cell.

As indicated above, FIG. 6 is provided as an example. Other examples may differ from what is described with regard to FIG. 6.

Figure 7:
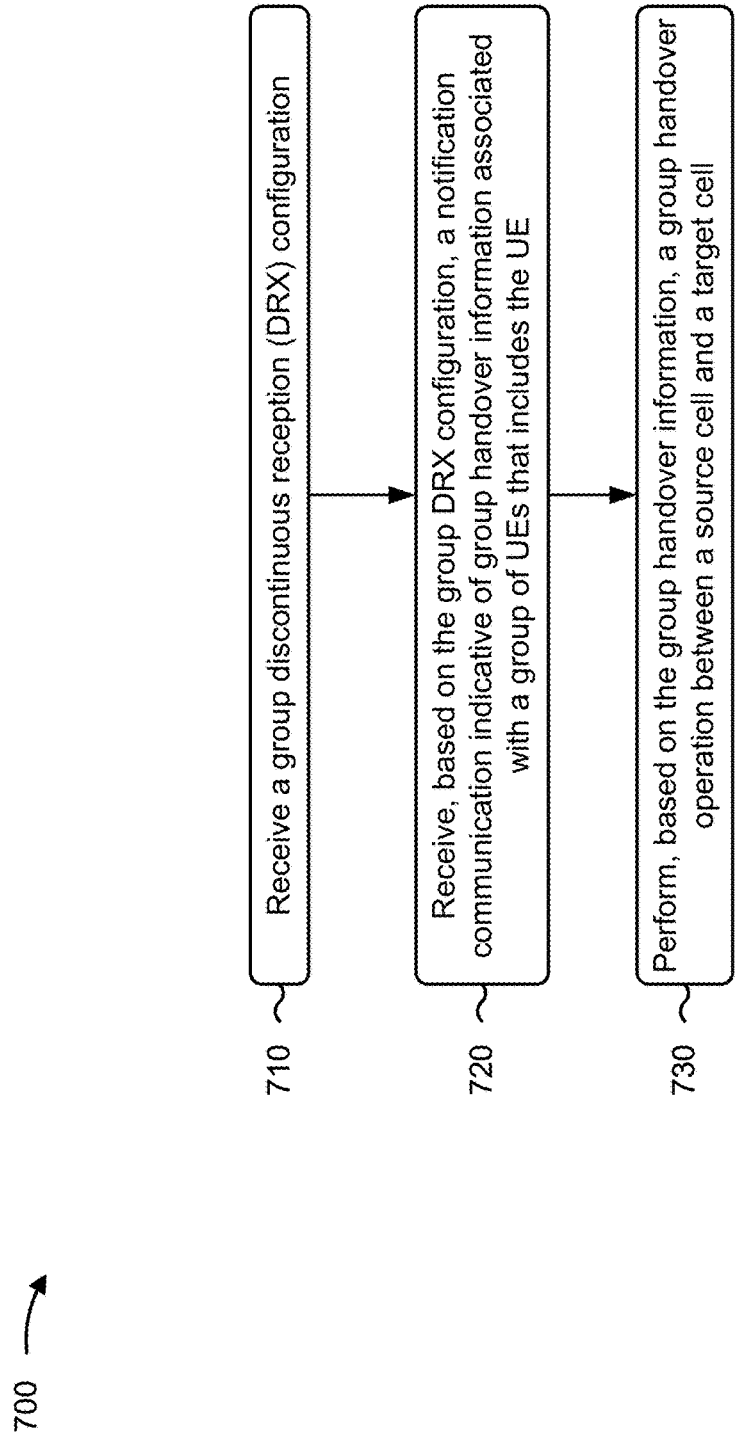
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., UE 602) performs operations associated with group handover configurations.

As shown in FIG. 7, in some aspects, process 700 may include receiving a group DRX configuration (block 710). For example, the UE (e.g., using communication manager 908 and/or reception component 902, depicted in FIG. 9) may receive a group DRX configuration, as described above in connection with FIG. 6.

As shown in FIG. 7, in some aspects, process 700 may include receiving, based on the group DRX configuration, a notification communication indicative of group handover information associated with a group of UEs that includes the UE (block 720). For example, the UE (e.g., using communication manager 908 and/or reception component 902, depicted in FIG. 9) may receive, based on the group DRX configuration, a notification communication indicative of group handover information associated with a group of UEs that includes the UE, as described above in connection with FIG. 6.

As further shown in FIG. 7, in some aspects, process 700 may include performing, based on the group handover information, a group handover operation between a source cell and a target cell (block 730). For example, the UE (e.g., using communication manager 908, reception component 902 and/or transmission component 904, depicted in FIG. 9) may perform, based on the group handover information, a group handover operation between a source cell and a target cell, as described above in connection with FIG. 6.

Process 700 may include additional aspects, such as any single aspect or any combination of aspects described below and/or in connection with one or more other processes described elsewhere herein.

In a first aspect, the group handover information indicates a group DRX offset associated with the group DRX configuration.

In a second aspect, alone or in combination with the first aspect, the group handover information indicates a group DRX cycle associated with the group DRX configuration.

In a third aspect, alone or in combination with one or more of the first and second aspects, the group DRX configuration indicates a group DRX occasion corresponding to a physical downlink control channel associated with the group of UEs.

In a fourth aspect, alone or in combination with one or more of the first through third aspects, the group DRX occasion corresponds to a subframe number based on a modular relationship between a group DRX cycle and a group DRX offset.

In a fifth aspect, alone or in combination with one or more of the first through fourth aspects, the group DRX configuration indicates a time window associated with the group handover operation.

In a sixth aspect, alone or in combination with one or more of the first through fifth aspects, process 700 includes monitoring a group radio network temporary identifier physical downlink control channel during the time window.

In a seventh aspect, alone or in combination with one or more of the first through sixth aspects, process 700 includes activating the group DRX configuration during the time window.

In an eighth aspect, alone or in combination with one or more of the first through seventh aspects, the group DRX configuration indicates a start time associated with the time window.

In a ninth aspect, alone or in combination with one or more of the first through eighth aspects, the group DRX configuration indicates an end time associated with the time window.

In a tenth aspect, alone or in combination with one or more of the first through ninth aspects, the time window comprises a time-based conditional handover (CHO) time window.

In an eleventh aspect, alone or in combination with one or more of the first through tenth aspects, process 700 includes receiving an activation command, and starting the time window based on receiving the activation command.

In a twelfth aspect, alone or in combination with one or more of the first through eleventh aspects, the notification communication comprises system information.

In a thirteenth aspect, alone or in combination with one or more of the first through twelfth aspects, the system information is indicative of a cell stop time offset, wherein a group DRX active time is based on the cell stop time offset, wherein the group DRX active time corresponds to the group DRX configuration.

In a fourteenth aspect, alone or in combination with one or more of the first through thirteenth aspects, the system information is indicative of a switch time, wherein a group DRX active time is based on the switch time, wherein the group DRX active time corresponds to the group DRX configuration.

In a fifteenth aspect, alone or in combination with one or more of the first through fourteenth aspects, the switch time comprises at least one of a satellite switch time or a gateway switch time.

In a sixteenth aspect, alone or in combination with one or more of the first through fifteenth aspects, the system information is indicative of a UE-specific time distribution offset.

In a seventeenth aspect, alone or in combination with one or more of the first through sixteenth aspects, process 700 includes activating the group DRX configuration, and deactivating a UE-specific DRX configuration based on activating the group DRX configuration.

In an eighteenth aspect, alone or in combination with one or more of the first through seventeenth aspects, process 700 includes activating the group DRX configuration, and monitoring a physical downlink control channel based on the group DRX configuration and a UE-specific DRX configuration.

In a nineteenth aspect, alone or in combination with one or more of the first through eighteenth aspects, process 700 includes activating the group DRX configuration, and monitoring a physical downlink control channel based on a BWP.

In a twentieth aspect, alone or in combination with one or more of the first through nineteenth aspects, the BWP comprises a default BWP.

In a twenty-first aspect, alone or in combination with one or more of the first through twentieth aspects, the BWP comprises a group DRX specific BWP.

In a twenty-second aspect, alone or in combination with one or more of the first through twenty-first aspects, the group handover information indicates the group DRX specific BWP.

In a twenty-third aspect, alone or in combination with one or more of the first through twenty-second aspects, process 700 includes receiving a UE-specific radio resource control message that indicates a time window associated with the group handover operation.

In a twenty-fourth aspect, alone or in combination with one or more of the first through twenty-third aspects, the notification communication comprises a wake-up signal associated with the group handover operation.

In a twenty-fifth aspect, alone or in combination with one or more of the first through twenty-fourth aspects, the wake-up signal comprises a physical downlink control channel wake up signal.

In a twenty-sixth aspect, alone or in combination with one or more of the first through twenty-fifth aspects, the wake-up signal comprises a group wake-up signal associated with the group of UEs.

In a twenty-seventh aspect, alone or in combination with one or more of the first through twenty-sixth aspects, the wake-up signal comprises a UE-specific wake-up signal associated with a UE-specific DRX occasion.

In a twenty-eighth aspect, alone or in combination with one or more of the first through twenty-seventh aspects, a physical downlink control channel monitoring occasion associated with the group handover operation corresponds to an offset relative to a wake-up signal occasion corresponding to the wake-up signal.

In a twenty-ninth aspect, alone or in combination with one or more of the first through twenty-eighth aspects, performing the group handover operation comprises performing the group handover operation based on the UE being included in a set of admitted UEs of the group of UEs.

In a thirtieth aspect, alone or in combination with one or more of the first through twenty-ninth aspects, the UE is included in the set of admitted UEs based on a timing advance relative to the target cell.

In a thirty-first aspect, alone or in combination with one or more of the first through thirtieth aspects, the UE is included in the set of admitted UEs based on at least one of a priority associated with the UE, a quality of service associated with the UE, or a characteristic of pending data associated with the UE.

In a thirty-second aspect, alone or in combination with one or more of the first through thirty-first aspects, the group handover operation is associated with at least one of a contention free PRACH resource or a dedicated PRACH resource.

In a thirty-third aspect, alone or in combination with one or more of the first through thirty-second aspects, the group DRX configuration indicates a group DRX occasion corresponding to a physical downlink control channel associated with the group of UEs, and the group DRX occasion corresponds to a paging DRX occasion.

In a thirty-fourth aspect, alone or in combination with one or more of the first through thirty-third aspects, the notification communication comprises a paging short message with handover indication, and the paging short message further schedules a handover command message.

In a thirty-fifth aspect, alone or in combination with one or more of the first through thirty-fourth aspects, the group DRX occasion is determined based on at least one of a UE identity being equal to zero or a common group UE identity.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
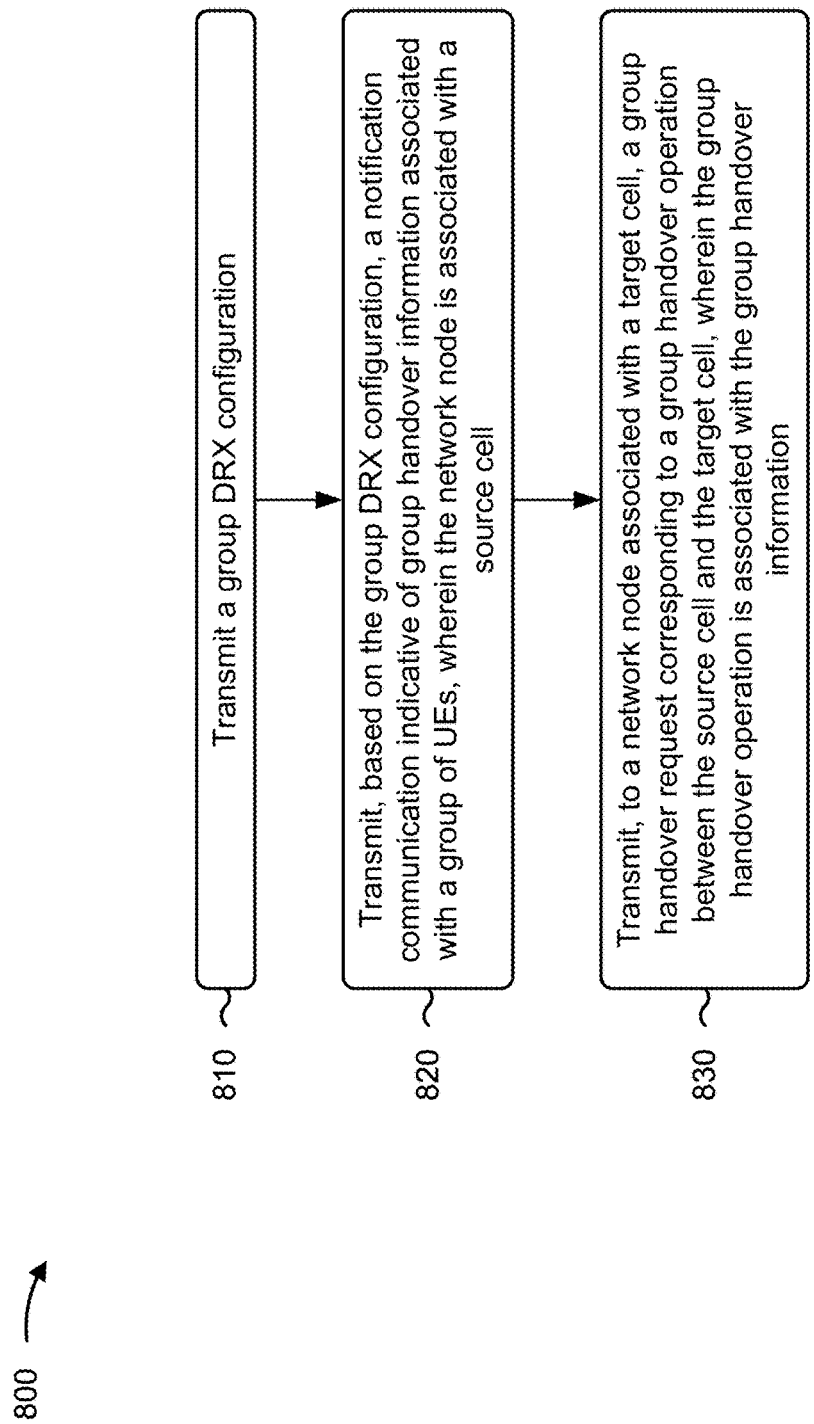
FIG. 8 is a diagram illustrating an example process performed, for example, by a network node, in accordance with the present disclosure.

FIG. 8 is a diagram illustrating an example process 800 performed, for example, by a network node, in accordance with the present disclosure. Example process 800 is an example where the network node (e.g., network node 606) performs operations associated with group handover configurations.

As shown in FIG. 8, in some aspects, process 800 may include transmitting a group DRX configuration (block 810). For example, the network node (e.g., using communication manager 1008 and/or transmission component 1004, depicted in FIG. 10) may transmit a group DRX configuration, as described above in connection with FIG. 6.

As shown in FIG. 8, in some aspects, process 800 may include transmitting, based on the group DRX configuration, a notification communication indicative of group handover information associated with a group of UEs, wherein the network node is associated with a source cell (block 820). For example, the network node (e.g., using communication manager 1008 and/or transmission component 1004, depicted in FIG. 10) may transmit, based on the group DRX configuration, a notification communication indicative of group handover information associated with a group of UEs, wherein the network node is associated with a source cell, as described above in connection with FIG. 6.

As further shown in FIG. 8, in some aspects, process 800 may include transmitting, to a network node associated with a target cell, a group handover request corresponding to a group handover operation between the source cell and the target cell, wherein the group handover operation is associated with the group handover information (block 830). For example, the network node (e.g., using communication manager 1008 and/or transmission component 1004, depicted in FIG. 10) may transmit, to a network node associated with a target cell, a group handover request corresponding to a group handover operation between the source cell and the target cell, wherein the group handover operation is associated with the group handover information, as described above in connection with FIG. 6.

Process 800 may include additional aspects, such as any single aspect or any combination of aspects described below and/or in connection with one or more other processes described elsewhere herein.

In a first aspect, the group handover information indicates a group DRX offset associated with the group DRX configuration.

In a second aspect, alone or in combination with the first aspect, the group handover information indicates a group DRX cycle associated with the group DRX configuration.

In a third aspect, alone or in combination with one or more of the first and second aspects, the group DRX configuration indicates a group DRX occasion corresponding to a physical downlink control channel associated with the group of UEs.

In a fourth aspect, alone or in combination with one or more of the first through third aspects, the group DRX occasion corresponds to a subframe number based on a modular relationship between a group DRX cycle and a group DRX offset.

In a fifth aspect, alone or in combination with one or more of the first through fourth aspects, the group DRX configuration indicates a time window associated with the group handover operation.

In a sixth aspect, alone or in combination with one or more of the first through fifth aspects, the group DRX configuration indicates a start time associated with the time window.

In a seventh aspect, alone or in combination with one or more of the first through sixth aspects, the group DRX configuration indicates an end time associated with the time window.

In an eighth aspect, alone or in combination with one or more of the first through seventh aspects, the time window comprises a time-based CHO time window.

In a ninth aspect, alone or in combination with one or more of the first through eighth aspects, process 800 includes transmitting an activation command, wherein the time window is started based on the activation command.

In a tenth aspect, alone or in combination with one or more of the first through ninth aspects, the notification communication comprises system information.

In an eleventh aspect, alone or in combination with one or more of the first through tenth aspects, the system information is indicative of a cell stop time offset, wherein a group DRX active time is based on the cell stop time offset, wherein the group DRX active time corresponds to the group DRX configuration.

In a twelfth aspect, alone or in combination with one or more of the first through eleventh aspects, the system information is indicative of a switch time, wherein a group DRX active time is based on the switch time, wherein the group DRX active time corresponds to the group DRX configuration.

In a thirteenth aspect, alone or in combination with one or more of the first through twelfth aspects, the switch time comprises at least one of a satellite switch time or a gateway switch time.

In a fourteenth aspect, alone or in combination with one or more of the first through thirteenth aspects, the system information is indicative of a UE-specific time distribution offset.

In a fifteenth aspect, alone or in combination with one or more of the first through fourteenth aspects, the group DRX configuration corresponds to a physical downlink control channel associated with a BWP.

In a sixteenth aspect, alone or in combination with one or more of the first through fifteenth aspects, the BWP comprises a default BWP.

In a seventeenth aspect, alone or in combination with one or more of the first through sixteenth aspects, the BWP comprises a group DRX specific BWP.

In an eighteenth aspect, alone or in combination with one or more of the first through seventeenth aspects, the group handover information indicates the group DRX specific BWP.

In a nineteenth aspect, alone or in combination with one or more of the first through eighteenth aspects, process 800 includes transmitting a UE-specific radio resource control message that indicates a time window associated with the group handover operation.

In a twentieth aspect, alone or in combination with one or more of the first through nineteenth aspects, the notification communication comprises a wake-up signal associated with the group handover operation.

In a twenty-first aspect, alone or in combination with one or more of the first through twentieth aspects, the wake-up signal comprises a physical downlink control channel wake up signal.

In a twenty-second aspect, alone or in combination with one or more of the first through twenty-first aspects, the wake-up signal comprises a group wake-up signal associated with the group of UEs.

In a twenty-third aspect, alone or in combination with one or more of the first through twenty-second aspects, the wake-up signal comprises a UE-specific wake-up signal associated with a UE-specific DRX occasion.

In a twenty-fourth aspect, alone or in combination with one or more of the first through twenty-third aspects, a physical downlink control channel monitoring occasion associated with the group handover operation corresponds to an offset relative to a wake-up signal occasion corresponding to the wake-up signal.

In a twenty-fifth aspect, alone or in combination with one or more of the first through twenty-fourth aspects, the group handover operation is associated with at least one of a contention free physical random access channel (PRACH) resource or a dedicated PRACH resource.

In a twenty-sixth aspect, alone or in combination with one or more of the first through twenty-fifth aspects, process 800 includes transmitting an additional notification communication indicative of additional group handover information associated with an additional group of UEs.

In a twenty-seventh aspect, alone or in combination with one or more of the first through twenty-sixth aspects, the group DRX configuration indicates a group DRX occasion corresponding to a physical downlink control channel associated with the group of UEs, and the group DRX occasion corresponds to a paging DRX occasion.

In a twenty-eighth aspect, alone or in combination with one or more of the first through twenty-seventh aspects, the notification communication comprises a paging short message with handover indication, and the paging short message further schedules a handover command message.

In a twenty-ninth aspect, alone or in combination with one or more of the first through twenty-eighth aspects, the group DRX occasion is determined based on at least one of a UE identity being equal to zero or a common group UE identity.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
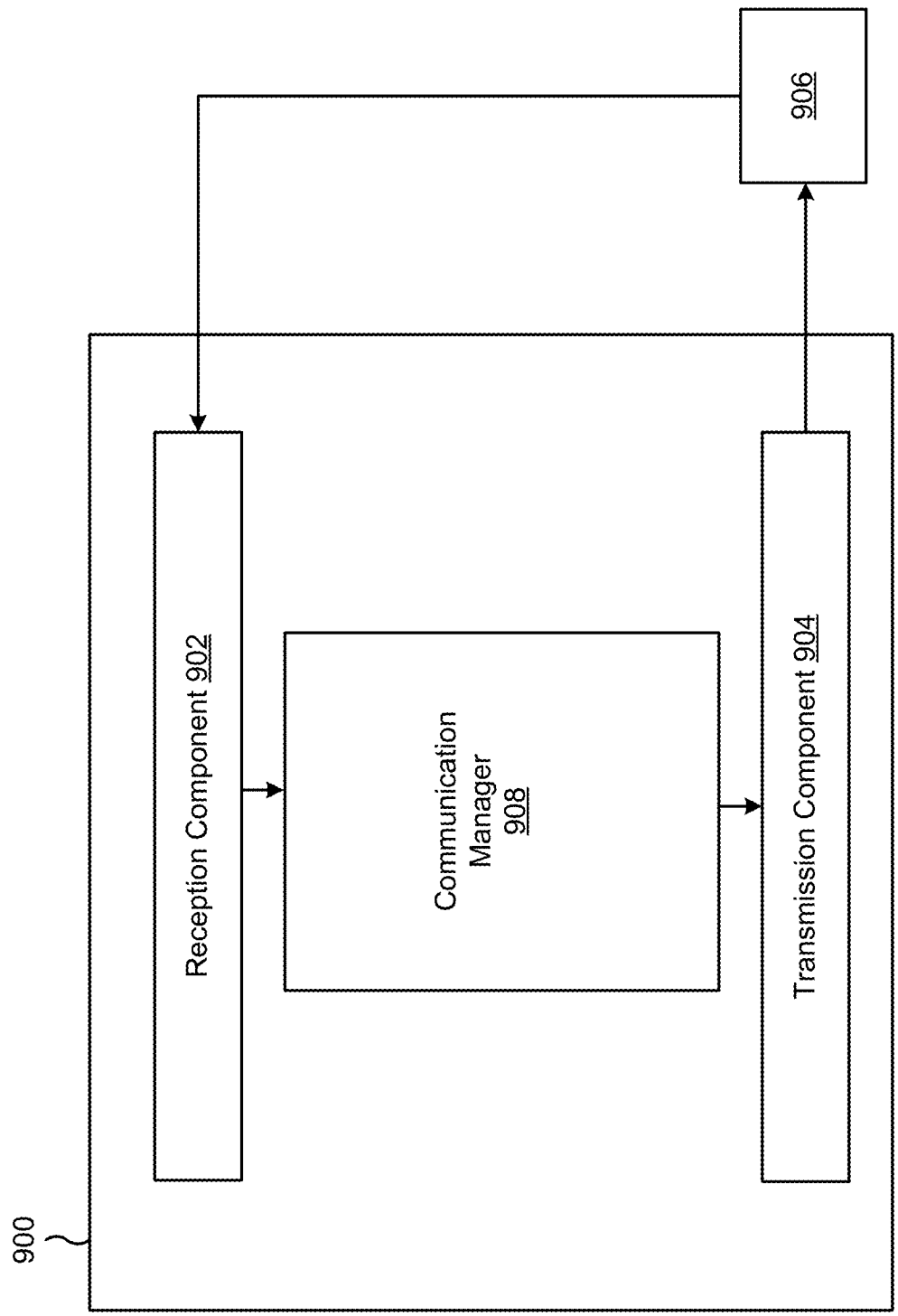
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a communication manager 908.

In some aspects, the apparatus 900 may be configured to perform one or more operations described herein in connection with FIG. 6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The communication manager 908 and/or the reception component 902 may receive a group DRX configuration. In some aspects, the communication manager 908 may include one or more antennas, a modem, a controller/processor, a memory, or a combination thereof, of the UE described in connection with FIG. 2. In some aspects, the communication manager 908 may include the reception component 902 and/or the transmission component 904. In some aspects, the communication manager 908 may be, be similar to, include, or be included in, the communication manager 140 depicted in FIGS. 1 and 2. The communication manager 908 and/or the reception component 902 may receive, based on the group DRX configuration, a notification communication indicative of group handover information associated with a group of UEs that includes the UE.

The communication manager 908, reception component, and/or the transmission component 904 may perform, based on the group handover information, a group handover operation between a source cell and a target cell. The communication manager 908 and/or the reception component 902 may monitor a group radio network temporary identifier physical downlink control channel during the time window. The communication manager 908 may activate the group DRX configuration during the time window. The communication manager 908 and/or the reception component 902 may receive an activation command. The communication manager 908 may start the time window based on receiving the activation command.

The communication manager 908 may activate the group DRX configuration. The communication manager 908 may deactivate a UE-specific DRX configuration based on activating the group DRX configuration. The communication manager 908 and/or the reception component 902 may monitor a physical downlink control channel based on the group DRX configuration and a UE-specific DRX configuration. The communication manager 908 and/or the reception component 902 may monitor a physical downlink control channel based on a BWP. The communication manager 908 and/or the reception component 902 may receive a UE-specific radio resource control message that indicates a time window associated with the group handover operation.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
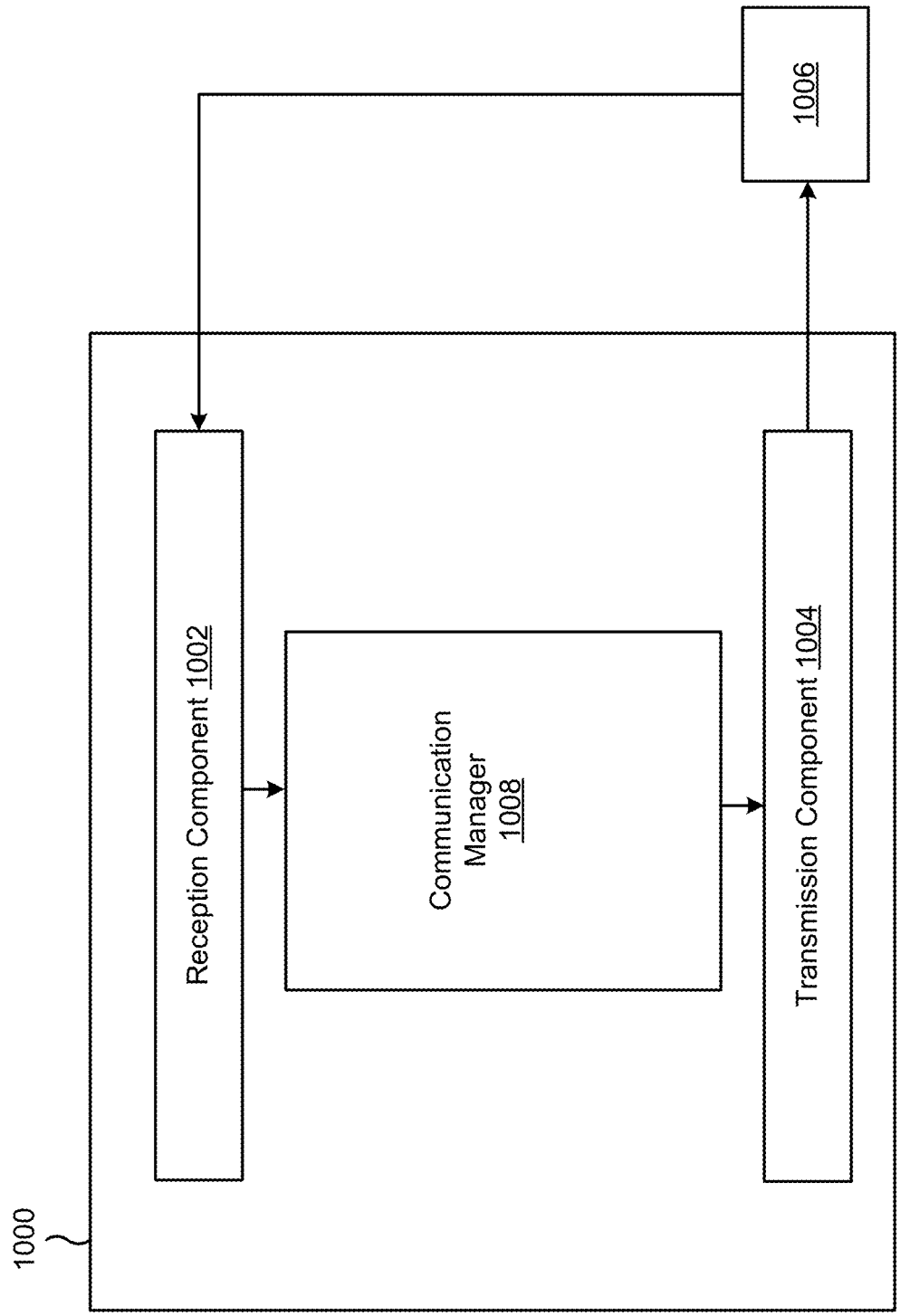
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a network node, or a network node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a communication manager 1008.

In some aspects, the apparatus 1000 may be configured to perform one or more operations described herein in connection with FIG. 6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network node described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network node described in connection with FIG. 2. In some aspects, the transmission component 1004 may be co-located with the reception component 1002 in a transceiver.

The communication manager 1008 and/or the transmission component 1004 may transmit a group DRX configuration. In some aspects, the communication manager 1008 may include one or more antennas, a modem, a controller/processor, a memory, or a combination thereof, of the network node described in connection with FIG. 2. In some aspects, the communication manager 1008 may include the reception component 1002 and/or the transmission component 1004. In some aspects, the communication manager 1008 may be, be similar to, include, or be included in, the communication manager 150 depicted in FIGS. 1 and 2. The communication manager 1008 and/or the transmission component 1004 may transmit, based on the group DRX configuration, a notification communication indicative of group handover information associated with a group of UEs, wherein the network node is associated with a source cell.

The communication manager 1008 and/or the transmission component 1004 may transmit, to a network node associated with a target cell, a group handover request corresponding to a group handover operation between the source cell and the target cell, wherein the group handover operation is associated with the group handover information. The communication manager 1008 and/or the transmission component 1004 may transmit an activation command, wherein the time window is started based on the activation command. The communication manager 1008 and/or the transmission component 1004 may transmit a UE-specific radio resource control message that indicates a time window associated with the group handover operation. The communication manager 1008 and/or the transmission component 1004 may transmit an additional notification communication indicative of additional group handover information associated with an additional group of UEs.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving a notification communication indicative of group handover information associated with a group of UEs that includes the UE, wherein the group handover information comprises a group discontinuous reception (DRX) configuration; and performing, based on the group handover information, a group handover operation between a source cell and a target cell.

Aspect 2: The method of Aspect 1, wherein the group handover information indicates a group DRX offset associated with the group DRX configuration.

Aspect 3: The method of either of Aspects 1 or 2, wherein the group handover information indicates a group DRX cycle associated with the group DRX configuration.

Aspect 4: The method of any of Aspects 1-3, wherein the group DRX configuration indicates a group DRX occasion corresponding to a physical downlink control channel associated with the group of UEs.

Aspect 5: The method of Aspect 4, wherein the group DRX occasion corresponds to a subframe number based on a modular relationship between a group DRX cycle and a group DRX offset.

Aspect 6: The method of any of Aspects 1-5, wherein the group DRX configuration indicates a time window associated with the group handover operation.

Aspect 7: The method of Aspect 6, further comprising monitoring a group radio network temporary identifier physical downlink control channel during the time window.

Aspect 8: The method of either of Aspects 6 or 7, further comprising activating the group DRX configuration during the time window.

Aspect 9: The method of any of Aspects 6-8, wherein the group DRX configuration indicates a start time associated with the time window.

Aspect 10: The method of any of Aspects 6-9, wherein the group DRX configuration indicates an end time associated with the time window.

Aspect 11: The method of any of Aspects 6-10, wherein the time window comprises a time-based conditional handover (CHO) time window.

Aspect 12: The method of any of Aspects 6-11, further comprising: receiving an activation command; and starting the time window based on receiving the activation command.

Aspect 13: The method of any of Aspects 6-12, wherein the notification communication comprises system information.

Aspect 14: The method of Aspect 13, wherein the system information is indicative of a cell stop time offset, wherein a group DRX active time is based on the cell stop time offset, wherein the group DRX active time corresponds to the group DRX configuration.

Aspect 15: The method of either of Aspects 13 or 14, wherein the system information is indicative of a switch time, wherein a group DRX active time is based on the switch time, wherein the group DRX active time corresponds to the group DRX configuration.

Aspect 16: The method of Aspect 15, wherein the switch time comprises at least one of a satellite switch time or a gateway switch time.

Aspect 17: The method of either of Aspects 15 or 16, wherein the system information is indicative of a UE-specific time distribution offset.

Aspect 18: The method of any of Aspects 1-17, further comprising: activating the group DRX configuration; and deactivating a UE-specific DRX configuration based on activating the group DRX configuration.

Aspect 19: The method of any of Aspects 1-18, further comprising: activating the group DRX configuration; and monitoring a physical downlink control channel based on the group DRX configuration and a UE-specific DRX configuration.

Aspect 20: The method of any of Aspects 1-19, further comprising: activating the group DRX configuration; and monitoring a physical downlink control channel based on a bandwidth part (BWP).

Aspect 21: The method of Aspect 20, wherein the BWP comprises a default BWP.

Aspect 22: The method of either of Aspects 20 or 21, wherein the BWP comprises a group DRX specific BWP.

Aspect 23: The method of Aspect 22, wherein the group handover information indicates the group DRX specific BWP.

Aspect 24: The method of any of Aspects 1-23, further comprising receiving a UE-specific radio resource control message that indicates a time window associated with the group handover operation.

Aspect 25: The method of any of Aspects 1-24, wherein the notification communication comprises a wake-up signal associated with the group handover operation.

Aspect 26: The method of Aspect 25, wherein the wake-up signal comprises a physical downlink control channel wake up signal.

Aspect 27: The method of either of Aspects 25 or 26, wherein the wake-up signal comprises a group wake-up signal associated with the group of UEs.

Aspect 28: The method of any of Aspects 25-27, wherein the wake-up signal comprises a UE-specific wake-up signal associated with a UE-specific discontinuous reception (DRX) occasion.

Aspect 29: The method of any of Aspects 25-28, wherein a physical downlink control channel monitoring occasion associated with the group handover operation corresponds to an offset relative to a wake-up signal occasion corresponding to the wake-up signal.

Aspect 30: The method of any of Aspects 1-29, wherein performing the group handover operation comprises performing the group handover operation based on the UE being included in a set of admitted UEs of the group of UEs.

Aspect 31: The method of Aspect 30, wherein the UE is included in the set of admitted UEs based on a timing advance relative to the target cell.

Aspect 32: The method of either of Aspects 30 or 31, wherein the UE is included in the set of admitted UEs based on at least one of a priority associated with the UE, a quality of service associated with the UE, or a characteristic of pending data associated with the UE.

Aspect 33: The method of any of Aspects 1-32, wherein the group handover operation is associated with at least one of a contention free physical random access channel (PRACH) resource or a dedicated PRACH resource.

Aspect 34: A method of wireless communication performed by a network node, comprising: transmitting a notification communication indicative of group handover information associated with a group of user equipment (UEs), wherein the network node is associated with a source cell, wherein the group handover information comprises a group discontinuous reception (DRX) configuration; and transmitting, to a network node associated with a target cell, a group handover request corresponding to a group handover operation between the source cell and the target cell, wherein the group handover operation is associated with the group handover information.

Aspect 35: The method of Aspect 34, wherein the group handover information indicates a group DRX offset associated with the group DRX configuration.

Aspect 36: The method of either of Aspects 34 or 35, wherein the group handover information indicates a group DRX cycle associated with the group DRX configuration.

Aspect 37: The method of any of Aspects 34-36, wherein the group DRX configuration indicates a group DRX occasion corresponding to a physical downlink control channel associated with the group of UEs.

Aspect 38: The method of Aspect 37, wherein the group DRX occasion corresponds to a subframe number based on a modular relationship between a group DRX cycle and a group DRX offset.

Aspect 39: The method of any of Aspects 34-38, wherein the group DRX configuration indicates a time window associated with the group handover operation.

Aspect 40: The method of Aspect 39, wherein the group DRX configuration indicates a start time associated with the time window.

Aspect 41: The method of either of Aspects 39 or 40, wherein the group DRX configuration indicates an end time associated with the time window.

Aspect 42: The method of any of Aspects 39-41, wherein the time window comprises a time-based conditional handover (CHO) time window.

Aspect 43: The method of any of Aspects 39-42, further comprising transmitting an activation command, wherein the time window is started based on the activation command.

Aspect 44: The method of any of Aspects 39-43, wherein the notification communication comprises system information.

Aspect 45: The method of Aspect 44, wherein the system information is indicative of a cell stop time offset, wherein a group DRX active time is based on the cell stop time offset, wherein the group DRX active time corresponds to the group DRX configuration.

Aspect 46: The method of either of Aspects 44 or 45, wherein the system information is indicative of a switch time, wherein a group DRX active time is based on the switch time, wherein the group DRX active time corresponds to the group DRX configuration.

Aspect 47: The method of Aspect 46, wherein the switch time comprises at least one of a satellite switch time or a gateway switch time.

Aspect 48: The method of any of Aspects 44-47, wherein the system information is indicative of a UE-specific time distribution offset.

Aspect 49: The method of any of Aspects 34-48, wherein the group DRX configuration corresponds to a physical downlink control channel associated with a bandwidth part (BWP).

Aspect 50: The method of Aspect 49, wherein the BWP comprises a default BWP.

Aspect 51: The method of either of Aspects 49 or 50, wherein the BWP comprises a group DRX specific BWP.

Aspect 52: The method of Aspect 51, wherein the group handover information indicates the group DRX specific BWP.

Aspect 53: The method of any of Aspects 34-52, further comprising transmitting a UE-specific radio resource control message that indicates a time window associated with the group handover operation.

Aspect 54: The method of any of Aspects 34-53, wherein the notification communication comprises a wake-up signal associated with the group handover operation.

Aspect 55: The method of Aspect 54, wherein the wake-up signal comprises a physical downlink control channel wake up signal.

Aspect 56: The method of either of Aspects 54 or 55, wherein the wake-up signal comprises a group wake-up signal associated with the group of UEs.

Aspect 57: The method of any of Aspects 54-56, wherein the wake-up signal comprises a UE-specific wake-up signal associated with a UE-specific discontinuous reception (DRX) occasion.

Aspect 58: The method of any of Aspects 54-57, wherein a physical downlink control channel monitoring occasion associated with the group handover operation corresponds to an offset relative to a wake-up signal occasion corresponding to the wake-up signal.

Aspect 59: The method of any of Aspects 34-58, wherein the group handover operation is associated with at least one of a contention free physical random access channel (PRACH) resource or a dedicated PRACH resource.

Aspect 60: The method of any of Aspects 34-59, further comprising transmitting an additional notification communication indicative of additional group handover information associated with an additional group of UEs.

Aspect 61: The method of any of Aspects 1-33, wherein the group DRX configuration indicates a group DRX occasion corresponding to a physical downlink control channel associated with the group of UEs, and wherein the group DRX occasion corresponds to a paging DRX occasion.

Aspect 62: The method of Aspect 61, wherein the notification communication comprises a paging short message with handover indication, the paging short message further scheduling a handover command message.

Aspect 63: The method of Aspect 61, wherein the group DRX occasion is determined based on at least one of a UE identity being equal to zero or a common group UE identity.

Aspect 64: The method of any of Aspects 34-60, wherein the group DRX configuration indicates a group DRX occasion corresponding to a physical downlink control channel associated with the group of UEs, and wherein the group DRX occasion corresponds to a paging DRX occasion.

Aspect 65: The method of Aspect 64, wherein the notification communication comprises a paging short message with handover indication, the paging short message further scheduling a handover command message.

Aspect 66: The method of Aspect 64, wherein the group DRX occasion is determined based on at least one of a UE identity being equal to zero or a common group UE identity.

Aspect 67: An apparatus for wireless communication at a device, comprising a processor; memory coupled with the processor; and instructions stored in the memory and executable by the processor to cause the apparatus to perform the method of one or more of Aspects 1-33 or 61-63.

Aspect 68: A device for wireless communication, comprising a memory and one or more processors coupled to the memory, the one or more processors configured to perform the method of one or more of Aspects 1-33 or 61-63.

Aspect 69: An apparatus for wireless communication, comprising at least one means for performing the method of one or more of Aspects 1-33 or 61-63.

Aspect 70: A non-transitory computer-readable medium storing code for wireless communication, the code comprising instructions executable by a processor to perform the method of one or more of Aspects 1-33 or 61-63.

Aspect 71: A non-transitory computer-readable medium storing a set of instructions for wireless communication, the set of instructions comprising one or more instructions that, when executed by one or more processors of a device, cause the device to perform the method of one or more of Aspects 1-33 or 61-63.

Aspect 72: An apparatus for wireless communication at a device, comprising a processor; memory coupled with the processor; and instructions stored in the memory and executable by the processor to cause the apparatus to perform the method of one or more of Aspects 34-60 or 64-66.

Aspect 73: A device for wireless communication, comprising a memory and one or more processors coupled to the memory, the one or more processors configured to perform the method of one or more of Aspects 34-60 or 64-66.

Aspect 74: An apparatus for wireless communication, comprising at least one means for performing the method of one or more of Aspects 34-60 or 64-66.

Aspect 75: A non-transitory computer-readable medium storing code for wireless communication, the code comprising instructions executable by a processor to perform the method of one or more of Aspects 34-60 or 64-66.

Aspect 76: A non-transitory computer-readable medium storing a set of instructions for wireless communication, the set of instructions comprising one or more instructions that, when executed by one or more processors of a device, cause the device to perform the method of one or more of Aspects 34-60 or 64-66.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
receiving a group discontinuous reception (DRX) configuration; and
receiving, based on the group DRX configuration, a notification communication indicative of group handover information associated with a group of UEs that includes the UE, wherein the group DRX configuration indicates a group DRX occasion corresponding to a physical downlink control channel associated with the group of UEs; and
performing, based on the group handover information, a group handover operation between a source cell and a target cell.

2. The method of claim 1, wherein the group handover information indicates at least one of a group DRX offset associated with the group DRX configuration or a group DRX cycle associated with the group DRX configuration.

3. The method of claim 1, wherein the group DRX occasion corresponds to a subframe number based on a modular relationship between a group DRX cycle and a group DRX offset.

4. The method of claim 1, wherein the group DRX configuration indicates a time window associated with the group handover operation.

5. The method of claim 4, further comprising monitoring a group radio network temporary identifier physical downlink control channel during the time window.

6. The method of claim 4, further comprising activating the group DRX configuration during the time window.

7. The method of claim 4, wherein the group DRX configuration indicates at least one of a start time associated with the time window or an end time associated with the time window.

8. The method of claim 4, wherein the time window comprises a time-based conditional handover (CHO) time window.

9. The method of claim 4, further comprising:
receiving an activation command; and
starting the time window based on receiving the activation command.

10. The method of claim 4, wherein the notification communication comprises system information, wherein the system information is indicative of at least one of a cell stop time offset or a switch time, wherein a group DRX active time is based on the at least one of the cell stop time offset or the switch time, and wherein the group DRX active time corresponds to the group DRX configuration.

11. The method of claim 10, wherein the switch time comprises at least one of a satellite switch time or a gateway switch time.

12. The method of claim 4, wherein the notification communication comprises system information, and wherein the system information is indicative of a UE-specific time distribution offset.

13. The method of claim 1, further comprising:
activating the group DRX configuration; and
at least one of deactivating a UE-specific DRX configuration based on activating the group DRX configuration, monitoring a physical downlink control channel based on the group DRX configuration and a UE-specific DRX configuration, or monitoring a physical downlink control channel based on a bandwidth part (BWP).

14. The method of claim 13, wherein the BWP comprises at least one of a default BWP or a group DRX specific BWP.

15. The method of claim 14, wherein the group handover information indicates the group DRX specific BWP.

16. The method of claim 1, further comprising receiving a UE-specific radio resource control message that indicates a time window associated with the group handover operation.

17. The method of claim 1, wherein the notification communication comprises a wake-up signal associated with the group handover operation.

18. The method of claim 17, wherein the wake-up signal comprises at least one of a physical downlink control channel wake up signal, a group wake-up signal associated with the group of UEs, or a UE-specific wake-up signal associated with a UE-specific discontinuous reception (DRX) occasion.

19. The method of claim 17, wherein a physical downlink control channel monitoring occasion associated with the group handover operation corresponds to an offset relative to a wake-up signal occasion corresponding to the wake-up signal.

20. The method of claim 1, wherein performing the group handover operation comprises performing the group handover operation based on the UE being included in a set of admitted UEs of the group of UEs.

21. The method of claim 20, wherein the UE is included in the set of admitted UEs based on at least one of a timing advance relative to the target cell, a priority associated with the UE, a quality of service associated with the UE, or a characteristic of pending data associated with the UE.

22. The method of claim 1, wherein the group handover operation is associated with at least one of a contention free physical random access channel (PRACH) resource or a dedicated PRACH resource.

23. The method of claim 1, wherein the group DRX configuration indicates a group DRX occasion corresponding to a physical downlink control channel associated with the group of UEs, and wherein the group DRX occasion corresponds to a paging DRX occasion.

24. The method of claim 23, wherein the notification communication comprises a paging short message with handover indication, the paging short message further scheduling a handover command message.

25. The method of claim 23, wherein the group DRX occasion is determined based on at least one of a UE identity being equal to zero or a common group UE identity.

26. A method of wireless communication performed by a network node, comprising:
transmitting a group discontinuous reception (DRX) configuration;
transmitting, based on the group DRX configuration, a notification communication indicative of group handover information associated with a group of user equipment (UEs), wherein the network node is associated with a source cell and wherein the group DRX configuration indicates a group DRX occasion corresponding to a physical downlink control channel associated with the group of UEs; and
transmitting, to a network node associated with a target cell, a group handover request corresponding to a group handover operation between the source cell and the target cell, wherein the group handover operation is associated with the group handover information.

27. The method of claim 26, wherein the group handover information indicates at least one of a group DRX offset associated with the group DRX configuration or a group DRX cycle associated with the group DRX configuration.

28. A user equipment (UE) for wireless communication, comprising:
a memory; and
one or more processors, coupled to the memory, configured to:
receive a group discontinuous reception (DRX) configuration;
receive, based on the group DRX configuration, a notification communication indicative of group handover information associated with a group of UEs that includes the UE, wherein the group DRX configuration indicates a group DRX occasion corresponding to a physical downlink control channel associated with the group of UEs; and
perform, based on the group handover information, a group handover operation between a source cell and a target cell.

29. A network node for wireless communication, comprising:
a memory; and
one or more processors, coupled to the memory, configured to:
transmit a group discontinuous reception (DRX) configuration;
transmit, based on the group DRX configuration, a notification communication indicative of group handover information associated with a group of user equipment (UEs), wherein the network node is associated with a source cell and wherein the group DRX configuration indicates a group DRX occasion corresponding to a physical downlink control channel associated with the group of UEs; and
transmit, to a network node associated with a target cell, a group handover request corresponding to a group handover operation between the source cell and the target cell, wherein the group handover operation is associated with the group handover information.

* * * * *